(12) United States Patent
Jakoby et al.

(10) Patent No.: US 9,369,217 B1
(45) Date of Patent: Jun. 14, 2016

(54) CELLULAR UP-LINK HARMONIC SPURS MITIGATION IN WI-FI AND BLUETOOTH RECEIVERS

(71) Applicant: Intel IP Corporation, Santa Clara, CA (US)

(72) Inventors: Assi Jakoby, Herzelia (IL); Assaf Gurevitz, Ramat Hasharon (IL); Rotem Avivi, Petah-Tiqwa (IL); Shimon Solodkin, Beer Sheva (IL); Bruno Jechoux, Antibes (FR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/571,827

(22) Filed: Dec. 16, 2014

(51) Int. Cl.
*H04B 1/10* (2006.01)
*H04B 15/06* (2006.01)
*H04W 4/00* (2009.01)
*H04B 1/04* (2006.01)
*H04B 15/00* (2006.01)
*H04B 1/7103* (2011.01)

(52) U.S. Cl.
CPC .............. *H04B 15/06* (2013.01); *H04B 1/0475* (2013.01); *H04B 1/10* (2013.01); *H04B 1/7103* (2013.01); *H04B 15/00* (2013.01); *H04W 4/008* (2013.01)

(58) Field of Classification Search
CPC ...... H04B 15/00; H04B 1/7103; H04B 1/525; H04B 1/109; H04B 1/10; H04B 1/38; H04L 1/0048
USPC ................. 375/219, 222, 285, 295, 316, 346; 370/210; 708/403, 404
See application file for complete search history.

(56) References Cited

U.S. PATENT DOCUMENTS

| | | | |
|---|---|---|---|
| 8,823,459 B2 * | 9/2014 | Obkircher ............ | H03B 5/1228 327/291 |
| 9,154,263 B1 * | 10/2015 | Muqlaibel ............. | H04L 1/0048 |
| 2009/0190633 A1 * | 7/2009 | Smith ................... | H04B 1/123 375/148 |
| 2013/0109433 A1 * | 5/2013 | Wang ..................... | H04B 1/525 455/552.1 |
| 2013/0203369 A1 * | 8/2013 | Dogan .................. | H04B 1/525 455/132 |
| 2015/0065157 A1 * | 3/2015 | Homchaudhuri ... | H04W 72/082 455/452.1 |

* cited by examiner

*Primary Examiner* — Tesfaldet Bocure
(74) *Attorney, Agent, or Firm* — Forefront IP Lawgroup, PLLC

(57) ABSTRACT

An interfering signal from a co-running modem is filtered using a notch filter to cancel high frequency harmonic interference to a received radio frequency (RF) signal. Thereafter, a metric scaling and tone nulling are performed in the received RF signal to further eliminate residual harmonic frequencies.

20 Claims, 6 Drawing Sheets

CELLULAR UP-LINK HARMONIC SPURS MITIGATION IN WI-FI AND BLUETOOTH RECEIVERS

BACKGROUND

Wireless communication systems may use one or more channels to transfer data between a transmitter and receivers. These communication systems may operate according to a set of standards defined by the Institute of Electrical and Electronics Engineers (IEEE) 802.11 committee for Wireless Local Area Network (WLAN) communication.

During the transfer of data between the transmitter and receivers, multipath problems and other conditions such as a presence of harmonic spurs may affect the reception of data packets. For example, the presence of the harmonic spurs that may mix with the receiving of the data packets may cause problems with signal detecting, amplifier gain adjustment, and signal decoding. To this end, the wireless communication systems employ various techniques to solve these problems and conditions.

For example, a linear amplifier design and/or Time Division Multiplexing (TDM) have been effectively implemented to mitigate these harmonic spurs. However, designing linear amplifiers and the use of the TDM may be more complicated and costly for a frequency varying harmonic spurs.

As such, there is a need for a lower cost and effective solution to address the above mentioned problems, i.e., mitigation of harmonic spurs at the receiver of the portable device.

DETAILED DESCRIPTION

Described herein is a technology for implementing a harmonic spurs reduction in a receiver of a portable device. For example, the receiver of the portable device receives a radio frequency (RF) signal that includes a Wi-Fi data packet. In this example, the receiving of the RF signal is co-running with an uplink cellular transmission from a cellular modem within the same device.

To mitigate harmonic spurs effect of the co-running uplink cellular transmission, or any other known spurs in the system, to the receiving of the RF signal, a notch filter is configured to filter the interfering harmonic frequencies of the co-running uplink cellular transmission, which may affect the de-sensitivity of the receiver of the portable device. For example, the notch filter may be configured to operate at interfering center frequency to eliminate the harmonic spurs produced by the uplink cellular transmission.

With the filtered uplink cellular transmission, the received RF signal is transformed from a time-domain into a frequency-domain RF signal. At the frequency-domain, a residual harmonic frequency confidence level of at least one metric in the frequency-domain RF signal is determined. For example, the frequency-domain RF signal may include tone bins with corresponding metrics. In this example, the residual harmonic frequency confidence level for each metric associated with the tone bins is determined. Thereafter, a tone nulling of the metric with the residual harmonic frequency confidence level that is below a configured threshold is performed. For example, the tone nulling includes discarding of the metric which fails to satisfy the configured threshold. In this example, the rest of the metrics are then processed for decoding to produce decoded bits.

Figure 1:
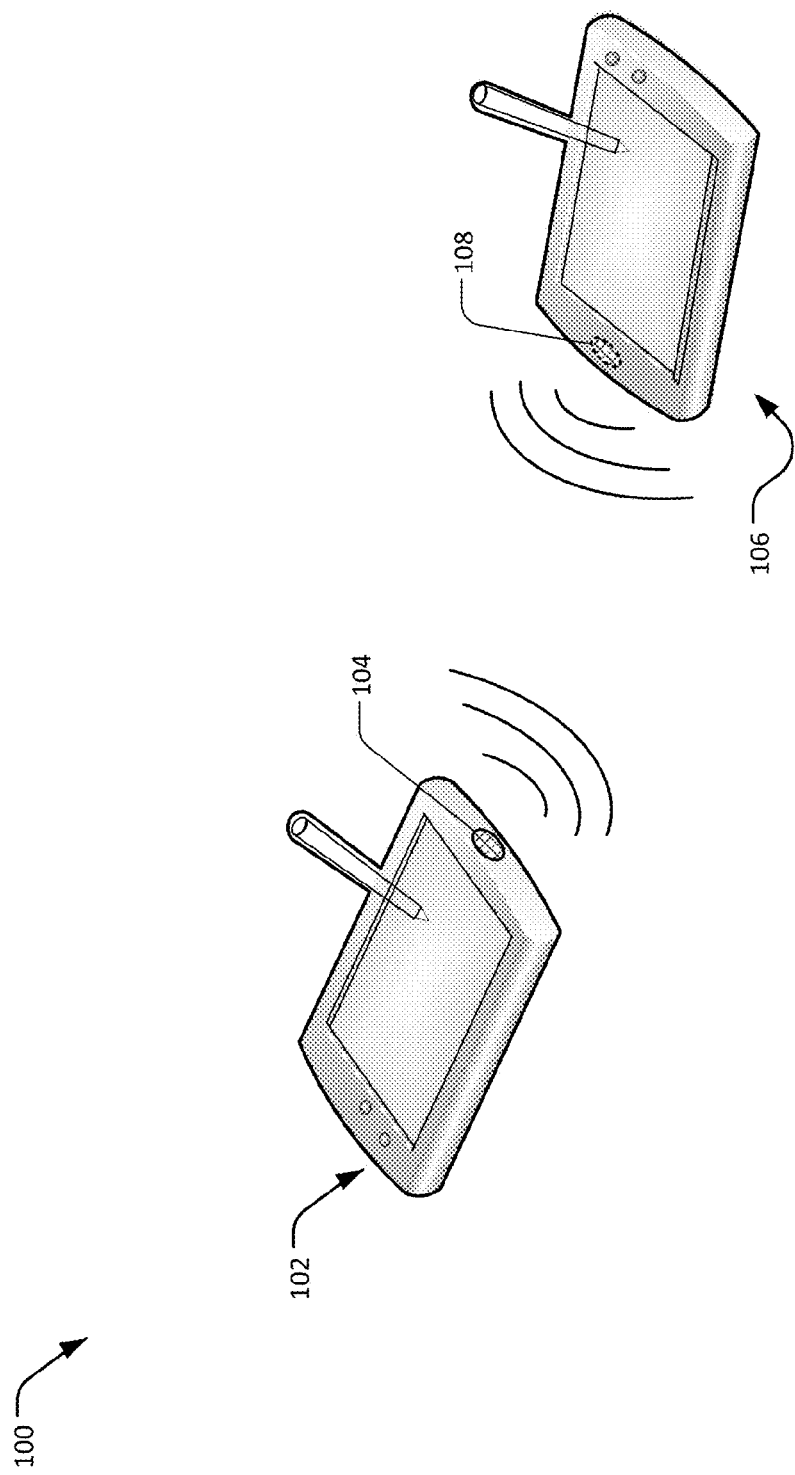
FIG. 1 illustrates an example scenario that implements harmonic spurs mitigation in a portable device.

FIG. 1 is an example scenario 100 that utilizes a harmonic spurs mitigation in a receiver circuitry or system of a portable device. The scenario 100 shows a portable device 102 with an antenna 104, and another portable device 106 with an antenna 106.

The portable devices 102 or 106 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The portable device 102, for example, may communicate with the other portable device 106 in a network environment. The network environment, for example, includes a cellular network configured to facilitate communications between the portable device 102 and the other portable device 106. During this cellular network communications, cellular uplink transmissions, for example, from the portable device 102 may interfere with its co-running of Bluetooth (BT) and Wi-Fi communication features. Thus, the implementations described herein may facilitate the harmonic spurs mitigation, for example, of the interfering cellular uplink transmissions or any interfering noise received by the receiver (e.g., harmonics from a circuit board) to BT and Wi-Fi wireless communications. In the above cellular network, a signal bandwidth (BW) for 2G, LTE PUCCH, or PUSCH (with <4 RB allocation) signals is relatively low compared to the Wi-Fi BW. As such, in the receiver circuitry or system of the portable devices 102 or 106, a time-domain filtering of the cellular interference may be performed by applying a frequency configurable notch filter (not shown) in its time-domain front end. Furthermore, a metric scaling and tone nulling may be further implemented at the frequency-domain end portion of the receiver circuitry. The time-domain notch filtering, for example, may facilitate acquisition of the Wi-Fi signals in the presence of cellular interference, while the frequency-domain tone nulling may allow for finer granularity of reducing the remaining interference energy in the Wi-Fi signals.

Figure 2A:
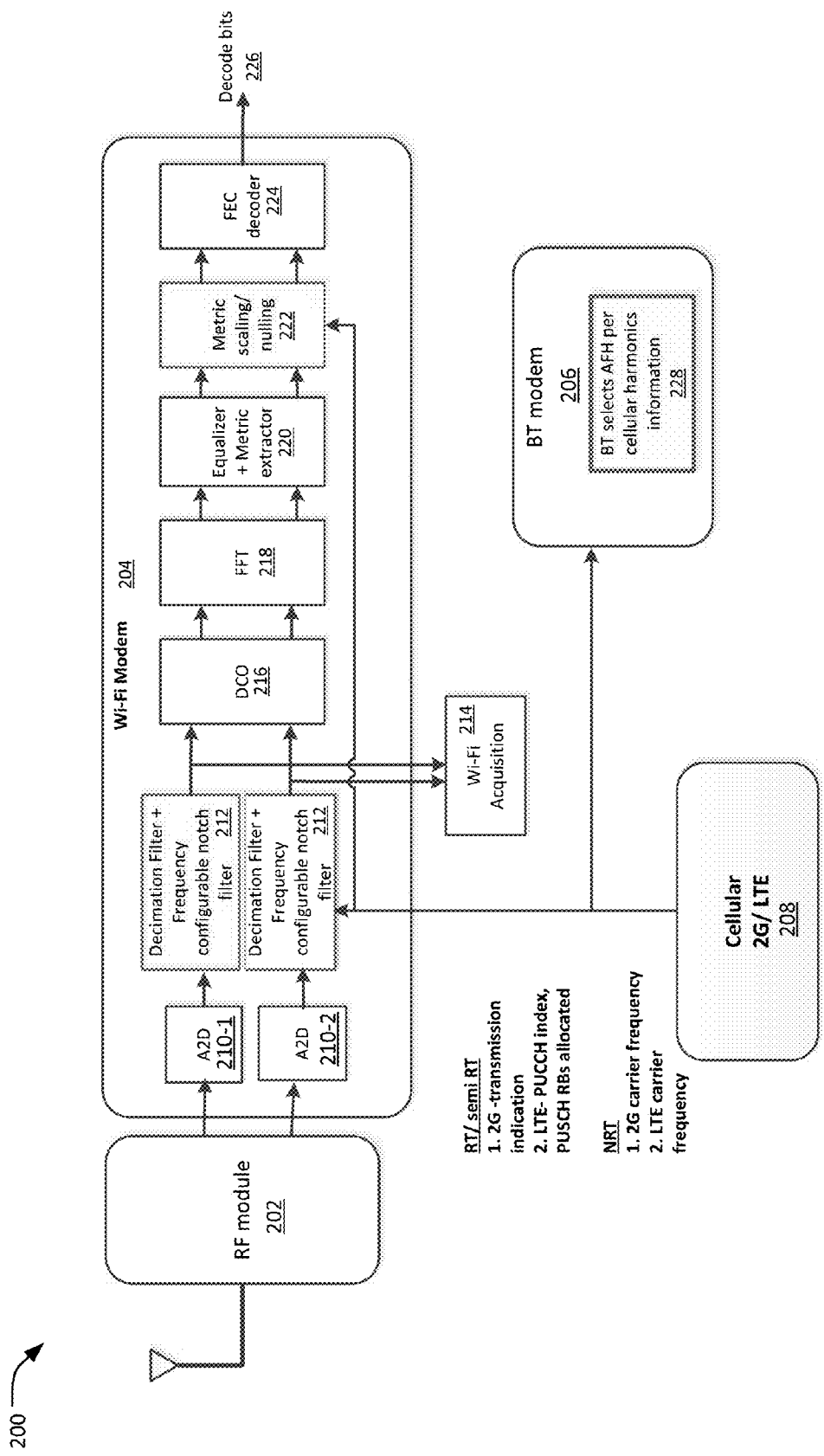
FIGS. 2A and 2B illustrate example block diagrams of a portable device receiver in accordance with implementations described herein.
Figure 2B:
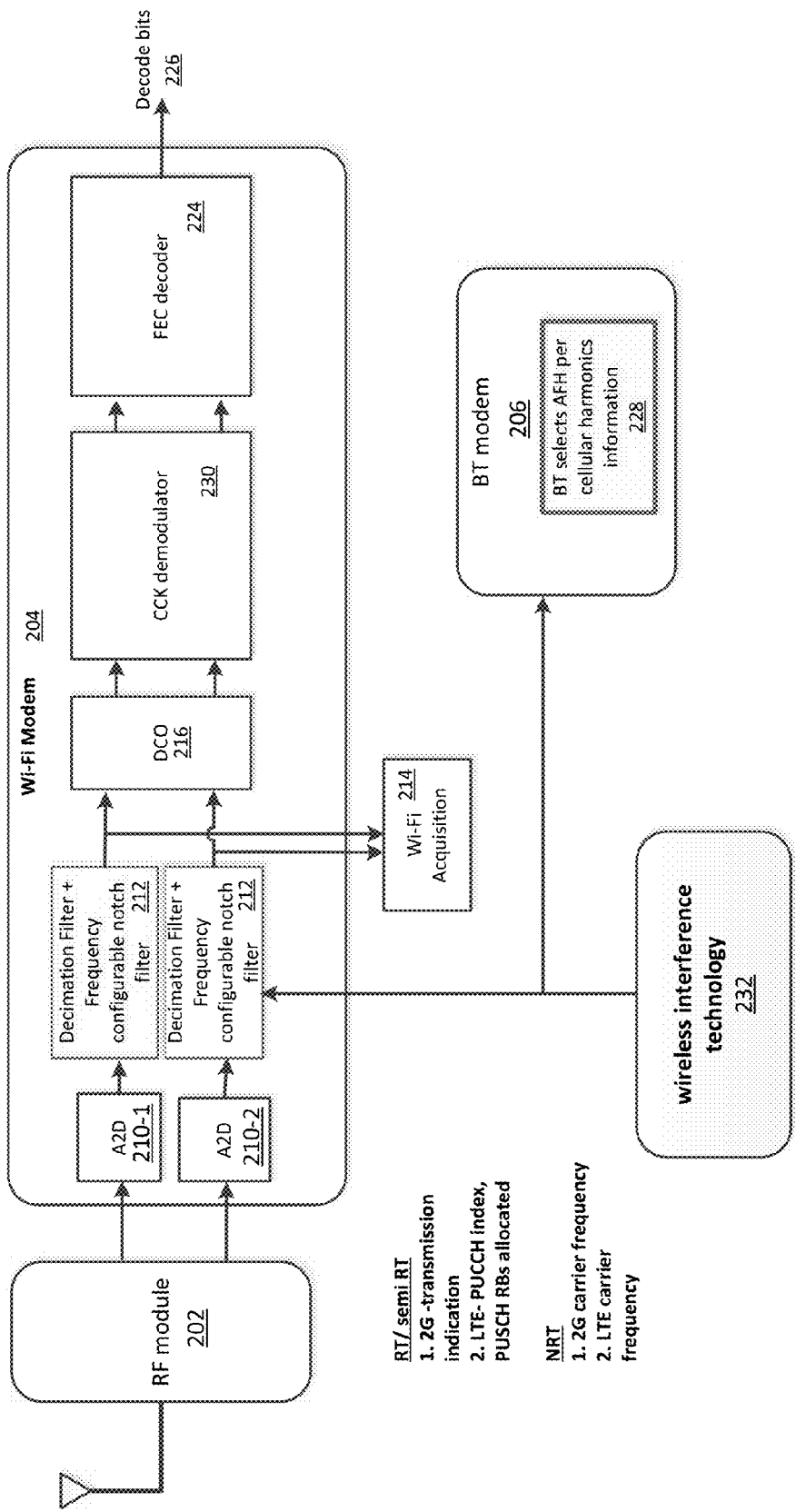

FIGS. 2A and 2B are example schematic block diagrams of a portable device receiver 200 as described in present implementations herein. The portable device receiver 200 may include a radio frequency (RF) module 202, a Wi-Fi modem 204, a BT modem 206, and a cellular modem 208 to enable the device to communicate over the cellular network. Furthermore, the portable device receiver 200 shows the Wi-Fi modem 204 to include an analog-to-digital converter (ADC) 210, a decimation/notch filters 212, a Wi-Fi acquisition component 214, a digital crystal oscillator (DCO) 216 (It is to be understood that other oscillators may be implemented, such as a transmit oscillator or XO, and other oscillators such as TXCO, XTAL, etc.), a Fast Fourier Transform (FFT) 218, an equalizer plus metric extractor 220, a metric scaling/nulling 222, a forward-error-correction (FEC) decoder, and decoded bits 226. It is also to be understood that portable receiver 200 may include one or more processors and one or more memory components.

As an example of present implementations herein, an uplink transmission from the cellular modem 208 may produce interfering harmonic frequencies to the co-running receiving operations of the Wi-Fi modem 204 and the BT modem 206. In this regard, the combination of notch filtering and metric scaling/tone nulling may be implemented in the Wi-Fi modem 204, while the time-domain notch filtering may be enough to suppress the harmonic distortions in the operation of the BT modem 206.

During the uplink transmissions by the cellular modem 208 using, for example, 2G, 3G or LTE carrier frequency, RF signals (or Wi-Fi signals) may be received at the same time by the co-running Wi-Fi modem 204 through the Wi-Fi acquisition component 214. The received RF signals, for example, passes through the RF module 212 where the received RF signals may be amplified by a low noise amplifier (not shown) to provide an amplified received or inbound RF signals. In this example, the amplified received RF signals may be further down-converted by a down-conversion module (not shown) and band-pass filtered to produce low intermediate frequency (IF) signals in the RF module 202.

The ADC 210 may then convert the low IF signals from an analog domain into digital domain to produce digital low IF signals. At this stage, the digital low IF signals may be affected by the interfering harmonic frequencies due to the uplink transmissions from the cellular modem 208 or any other spur interference. The interfering harmonic frequencies, for example, produces a de-sensitivity in the Wi-Fi modem 104. In this example, the digital low IF signals may still be reconstructed and/or demodulated; however, the harmonic frequencies from the uplink transmissions may cause the de-sensitivity of the Wi-Fi modem 104 to reach about 40 dB. By using the combination of the notch filtering and metric scaling/nulling as described herein, the de-sensitivity of the Wi-Fi modem may improve up to 35 dB, which may result to improved de-sensitivity of 5 dB.

As an example of present implementations herein, the decimation/notch filter 212 is implemented at time-domain front end of the receiver block diagram 100. The decimation filter of the decimation/notch filter 212 may perform a low-pass filtering of the received digital low IF signals and thereafter down-samples the digital low IF signals to provide channel selected signals On the other hand, the frequency configurable notch filter of the decimation/notch filter 212 may be configured to cancel the interfering harmonic frequencies due to the uplink transmissions from the cellular modem 208. For example, the Wi-Fi modem 204 may facilitate configuration of the notch filtering to operate at an interference center frequency. In this example, the Wi-Fi modem 204 may derive this configuration of the notch filter based upon Non-Real Time (NRT) indication of a) 2G-GSM, GPRS, EDGE channel frequency, 3G for IEEE 802.11ac where the Wi-Fi bandwidth is 80/160 MHz; and b) LTE channel frequency. Furthermore, the Wi-Fi modem 204 may utilize Real Time (RT) information indicating: a) Cellular is transmitting GSM, GPRS, EDGE, b) 2G transmission indication+TX center frequency (in case of hopping), and c) Cellular is transmitting LTE PUCCH+PUCCH index or LTE PUSCH+allocated RB, when configuring the notch filter of the decimation/notch filter 212. Furthermore still, the Wi-Fi modem 204 may utilize the RT/NRT information from 2G/LTE such as whether the 2G is transmitting or not, the 2G carrier frequency, etc. in understanding the spur frequency and the respective time when interfering harmonic frequency is present.

From the above information, the Wi-Fi modem 204 may decide the frequency range where the harmonic spurs fall in the 2.4 GHz/5 GHz Wi-Fi bands. For example, the Wi-Fi modem 204 may configure the notch filtering to include an operating center frequency of the interfering harmonic spurs. In this example, the Wi-Fi modem 204 may further activate the metric tone nulling or scaling based on expected interference level at the frequency, and based on the remaining frequency bins (i.e., output of FFT 218) which are interfered by the cellular uplink transmission.

With continuing reference to FIG. 2A, the DCO 216 is utilized, for example, as a digitally controlled voltage-to-frequency converter. For example, the DCO 216 produces a frequency variation in response to a control voltage, which is facilitated by the channel selected signals. In this example, the DCO 216 provides the frequency variation equivalence of the channel selected signals to the FFT 218.

The FFT 218 may perform an algorithm that converts the received channel selected signals from time domain to frequency domain. For example, the channel selected signals include an array of time-domain waveform samples. In this example, the FFT 218 converts time-domain waveform samples into frequency-domain spectrum samples such as a plurality of received symbols. The frequency-domain spectrum samples may include tone bins with corresponding metrics to define a data packet.

The equalizer plus metric extractor 220 receives the transformed channel selected signals and determines a plurality of equalized received symbols. Based on the plurality of equalized received symbols, the metric extractor may provide a corresponding plurality of metrics. For example, an equalized symbol may correspond to one or more metrics. In this example, the corresponding one or more metrics are further scaled or nulled by the metric scaling/nulling 222 upon a determination of a confidence level of the residual harmonic frequency that may be present in the corresponding one or more metrics. For example, the determination of the confidence level utilizes a threshold to determine whether or not to discard the said one or more metrics at the FEC decoder 224.

As an example implementation described herein, the metric scaling/nulling 222 is configured to eliminate residual harmonic interference present in the channel selected signal prior to the FEC decoding. For example, the time domain notch filtering as discussed above may facilitate receiving of the Wi-Fi signals in the presence of the cellular interference from the cellular modem 208. In this example, the metric scaling/nulling 222 provides for finer granularity of reducing the remaining interference energy at the output of the equalizer plus Wi-Fi metric extractor 220, which feeds the FEC decoder 224. The metric scaling/nulling 222, unlike the decimation/notch filtering, is implemented at frequency-domain end of the portable device receiver 200.

In an implementation, the metric scaling/nulling 222 processes the corresponding one or more metrics for each equalized symbol. In this example, the processing may include elimination or tone nulling of the one or more metrics that contains residual harmonic frequency. In other words, an algorithm may be performed to determine presence of residual harmonic frequency on the one or more metrics. The algorithm may include the threshold level to determine the residual harmonic frequency confidence level for the one or more metrics. For example, the metric scaling/nulling 222 may discard or scale the one or more metrics with residual harmonic frequency confidence level that is below the configured threshold. In this example, the tone bins that contains the discarded one or more metrics may be nulled prior to the FEC decoding.

With the given harmonic frequency suppression provided by the decimation/notch filter 212 and the metric scaling/nulling 222, the FEC decoder 224 recovers and demodulates the digital data from the channel selected signals. In this example, the FEC decoder 224 includes the decode bits 226 as an output. The decode bits 226 may be free from harmonic frequency interferences.

With continuing reference to FIG. 2A, the BT modem 206 may utilize an adaptive frequency hopping (AFH) based on above discussed harmonic interference suppression. Typically, the AFH allows the BT modem 206 to adapt to the environment by identifying fixed sources of interference and excluding them from the list of available channels. This process of re-mapping may involve reduction of the number of channels to be used by the BT modem 206. Block 228 represents how the BT modem 206 selects AFH per cellular harmonics information. An example further details this in the description of process flowchart 500 discussed below.

In an implementation, the AFH may set aside channel or channels that include harmonic spurs. For example, the notch filtering at the decimation/notch filter 212 may discard one or more channels that contain interfering harmonic spurs. In this example, the BT modem 206 may utilize the channels that were not affected by the interfering harmonic frequencies from the cellular modem 208.

Although the example portable device receiver 200 illustrates in a limited manner basic components of the receiver of the portable device, other components such as battery, one or more processors, SIM card, etc. were not described in order to simplify the embodiments described herein.

FIG. 2B is another example implementation of the portable device receiver 200 when using the 802.11b standard. As shown, a complementary code keying (CCK) demodulator/decoding 230 replaces the FFT 218, the equalizer plus metric extractor 220 and the metric scaling/nulling 222 that were previously described in FIG. 2A Because the 802.11b standard does not include the FFT 218 in its circuitry, the decimation/notch filter 212 may be implemented even without the metric scaling/nulling 222. That is, the unwanted harmonic frequencies from the co-running uplink transmission may be filtered and/or eliminated by the decimation/notch filter 212 as discussed above.

In an implementation, block 232 may not be limited to the cellular modem 208 as described in FIG. 2A above. For example, in digitally enhanced cordless telecommunications (DECT), the block 232 may include wireless interference technology other than the cellular uplink transmission interference as described above. In this example, similar procedure such as the notch filtering may be implemented to reduce the interference from the wireless interference technology.

Figure 3:
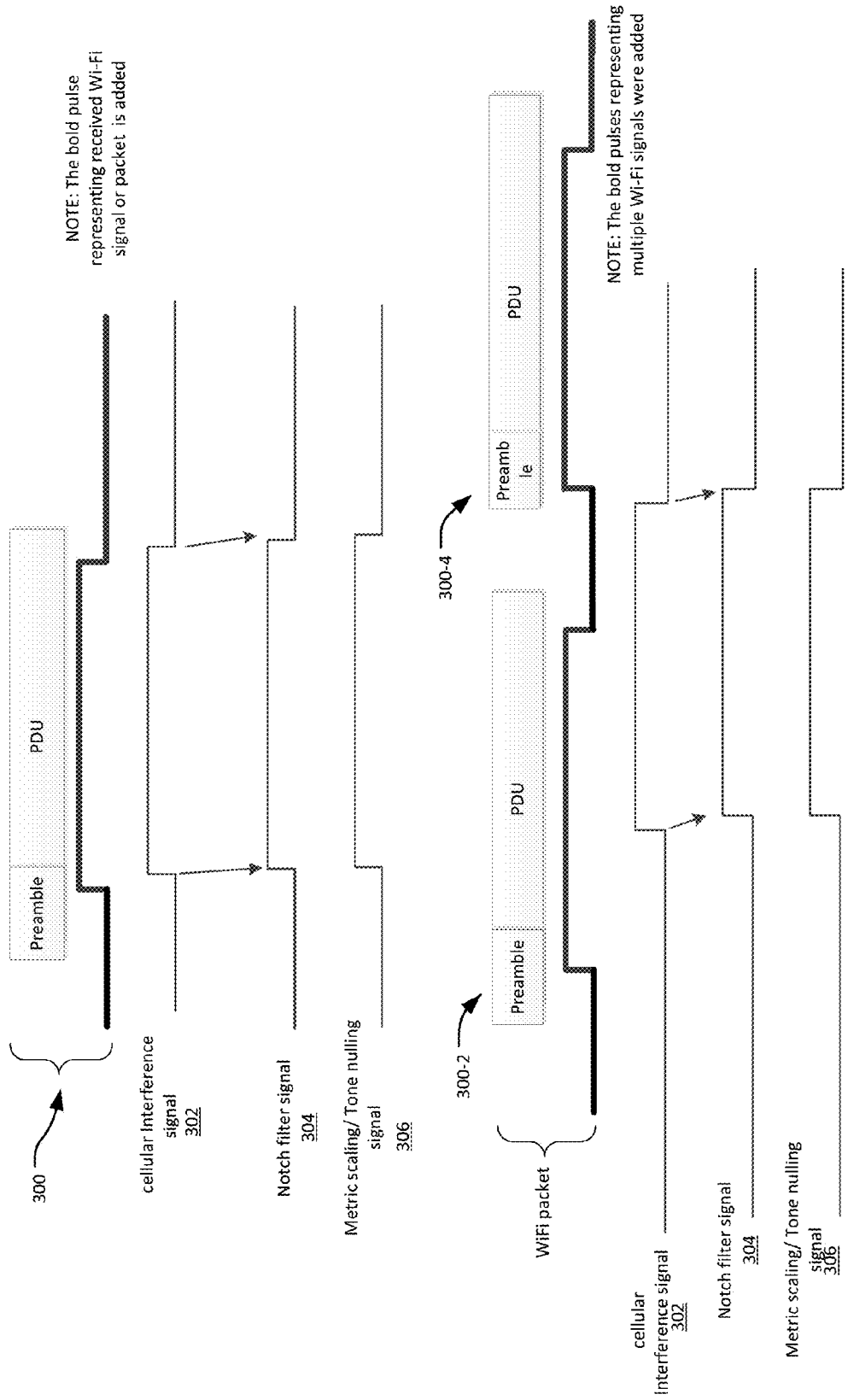
FIG. 3 illustrates an example illustration of mitigating harmonic spurs in accordance with implementations described herein.

FIG. 3 is an example illustration of harmonic spurs mitigation in accordance with implementations described herein. FIG. 3A shows a Wi-Fi packet 300, a cellular interference signal 302, a notch filter signal 304, and a metric scaling/tone nulling signal 306.

In an implementation, the Wi-Fi packet 300 may be received through the Wi-Fi acquisition component 214 as discussed in FIG. 2A above. On the other hand, the cellular interference 302 may be generated by the uplink cellular transmission from the cellular modem 208.

Based from the RT/NRT information as discussed above, the frequency configurable notch filter may produce the notch filter signal 302. The notch filter signal 304, for example, is a notch filtered cellular interference signal 302. In other words, the notch filter signal 304 may not include the interfering higher harmonic frequencies of the cellular interference signal 302.

In an implementation, the combination of the notch filtering and the metric scaling/tone nulling produces the metric scaling/tone nulling signal 306. In this implementation, the metric scaling/tone nulling signal 306 further eliminates residual harmonic frequencies due to the cellular interference signal 302.

With continuing reference to FIG. 3, the Wi-Fi packets 300-2 and 300-4 are successive data packets that may be received during the uplink cellular transmission. In an implementation, the notch filter signal 304 and the metric scaling/tone nulling signal 306 may adapt the same configuration as discussed above.

Figure 4:
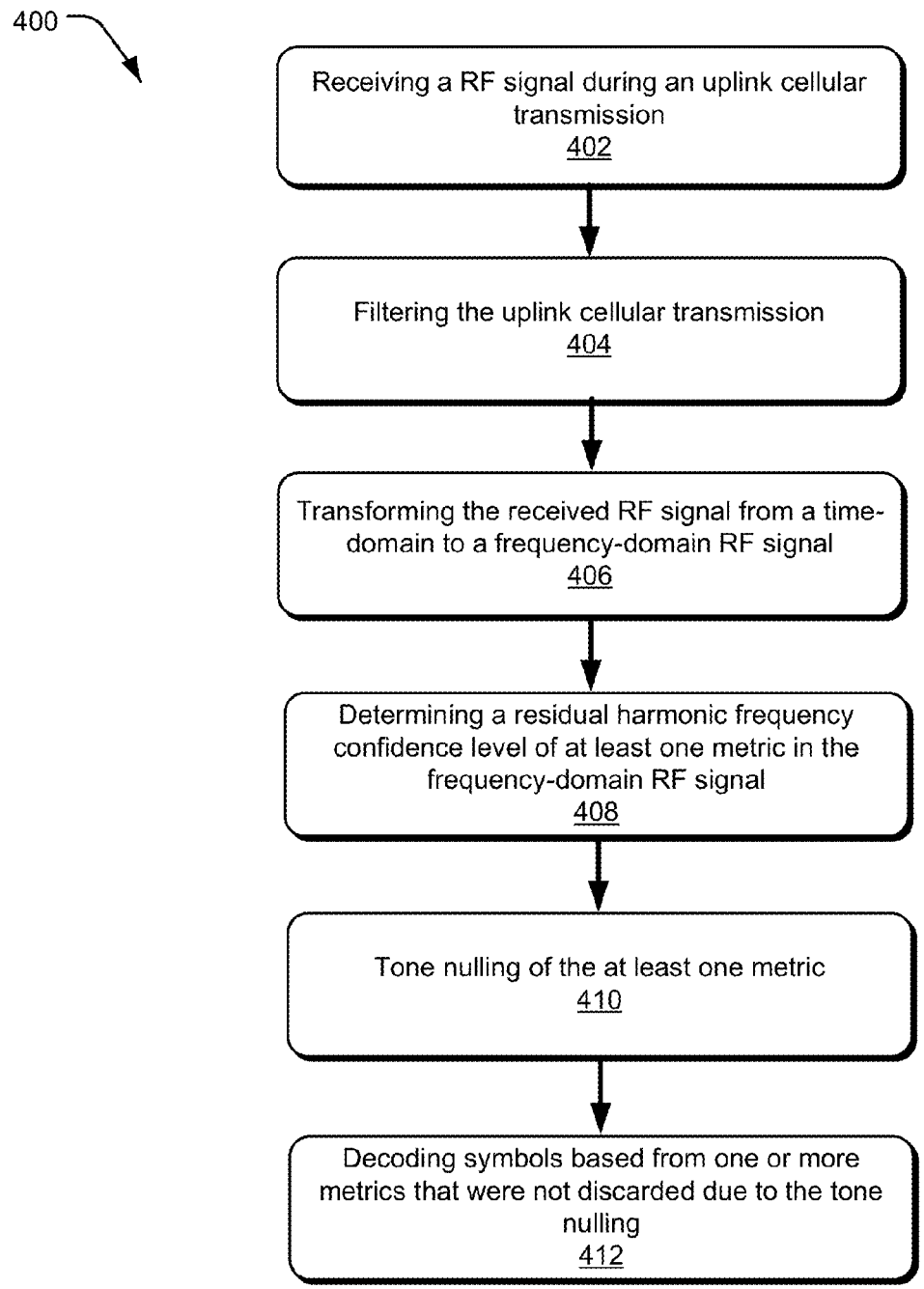
FIG. 4 illustrates an exemplary process for implementing harmonic spurs reduction in accordance with implementations described herein.

FIG. 4 shows an example process flowchart 400 illustrating an example method for harmonic spurs mitigation in Wi-Fi and BT receivers of a portable device. The harmonic spurs, for example, are produced by co-running uplink transmission from the cellular modem within the same portable device. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, receiving of RF signals during an uplink cellular transmission is performed. For example, the Wi-Fi modem 204 receives the RF signals through the RF module 202. In this example, the received RF signals may undergo different electronic processing such as amplification, down-conversion, and band-pass filtering to produce a low IF signal. Furthermore, the ADC 210 may convert the analog low IF signals into digital low IF signals.

At block 404, filtering the uplink cellular transmission by a notch filter is performed. For example, the decimation/notch filter 212 includes the frequency configurable notch filter to cancel higher frequency harmonics from the uplink cellular transmission. The uplink cellular transmission is produced by the cellular modem 208, which is co-running with the Wi-Fi and BT receiving operations.

At block 406, transforming the received RF signal from a time-domain to a frequency-domain RF signal is performed. For example, the channel selected signals include an array of time-domain waveform samples. In this example, the FFT 218 converts the time-domain waveform samples into frequency-domain spectrum samples. The frequency-domain spectrum samples may include Nyquist sampling of the time-domain input signals.

At block 408, determining a residual harmonic frequency confidence level of at least one metric in the frequency-domain RF signals is performed. For example, the output of the FFT 218 is received by the equalizer plus metric extractor 220 in order to determine and produce the plurality of equalized received symbols. In this example, the plurality of equalized received symbols include one or metrics that may carry the residual interfering harmonic frequencies. Thus, an algorithm is performed in order to determine the residual harmonic frequency level of the one or more metrics.

At block 410, nulling the metric in response to the determining of the residual harmonic frequency confidence level that is below a configured threshold is performed. For example, the metric scaling/nulling 222 may be configured to discard the tone bins and corresponding metrics in a case where the residual harmonic frequency confidence level of the corresponding metric is below the configured threshold.

At block 412, decoding symbols based from one or more metrics that were not discarded due to the tone nulling is performed. In a case where the one or more metrics with no residual harmonic frequency are identified, the FEC decoder 224 may be configured to produce the decode bits 226.

In an implementation, the BT modem 206 may select channels through AFH process by taking into consideration the channel or channels with no interfering harmonic frequencies as discussed above.

Figure 5:
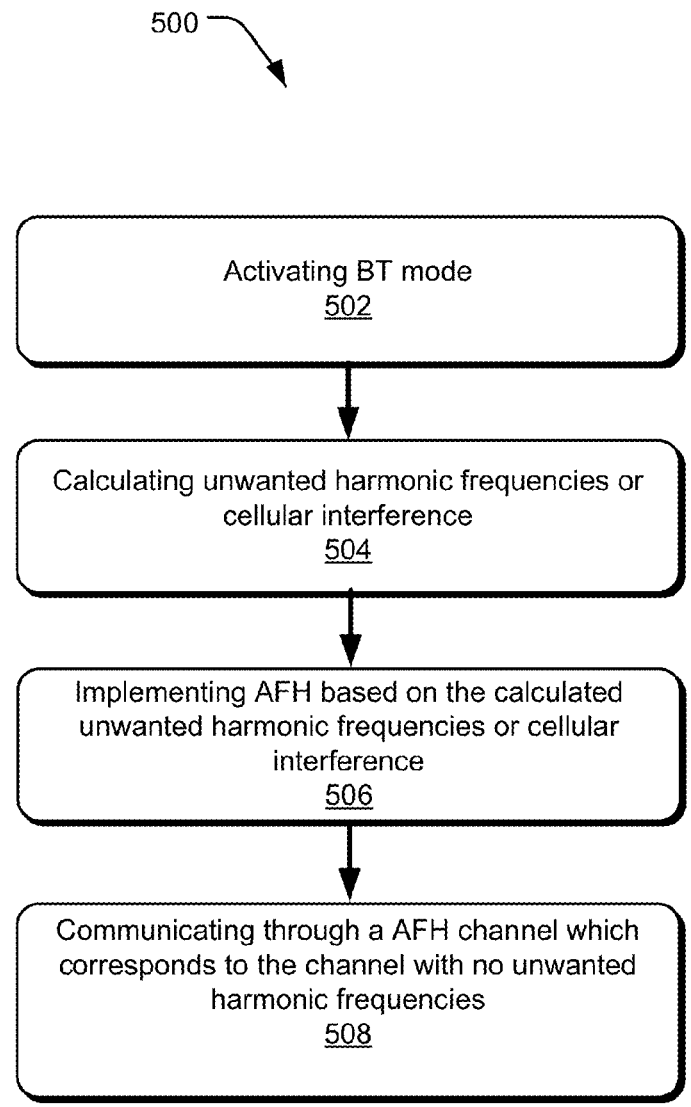
FIG. 5 illustrates an exemplary process for implementing harmonic spurs reduction in accordance with implementations described herein.

FIG. 5 shows an example process flowchart 500 illustrating an example method for Bluetooth (BT) protection and adaptive frequency hopping (AFH). Process 500 may be implemented for example in block 228 of BT modem 206 described above. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, activating a BT mode of a device is performed. For example, the BT modem 206 is activated to perform the BT mode of wireless communication. In this example, the BT modem 206 is co-running with the cellular 2G/LTE 208.

At block 504, calculating unwanted harmonic frequencies from a co-running uplink cellular transmission is performed. For example, the block 228 implements an algorithm that measures and determines the unwanted harmonic frequencies due to the uplink cellular transmission from the co-running cellular 2G/LTE 208.

At block 506, implementing the adaptive frequency hopping (AFH) is performed. For example, AFH channel frequency negotiation is performed with BT connected peer devices. In this example, the AFH channel frequency negotiation may be based upon the calculated unwanted harmonic frequencies in block 504 above.

At block 508, communicating through a AFH channel is performed. For example, the AFH channel includes the channel/s with no unwanted harmonic frequencies.

The following examples pertain to further embodiments:

Example 1 is a method of harmonic spur mitigation comprising: receiving of a radio frequency (RF) signal during an uplink transmission or upon receipt of an interfering noise; filtering the uplink transmission or the interfering noise by a notch filter; and demodulating the received RF signal.

In example 2, the method as recited in example 1, wherein the demodulating of the received RF signal further comprises: transforming the received RF signal from a time-domain into a frequency-domain RF signal; determining a residual harmonic frequency confidence level of at least one metric in the frequency-domain RF signal; tone nulling of the at least one metric in response to the determination of the residual harmonic frequency confidence level; and decoding symbols based from a plurality of metrics that remain from the tone nulling.

In example 3, the method as recited in example 2, wherein the determining of the residual harmonic frequency confidence level includes comparing of the confidence level to a threshold.

In example 4, the method as recited in example 2, wherein the tone nulling discards tone bins that includes the at least one metric with the confidence level that is below a threshold value.

In example 5, the method as recited in any of examples 1 to 4, wherein the demodulating of the received RF signal is implemented in a time-domain.

In example 6, the method as recited in any of examples 1 to 4, wherein the filtering of the uplink transmission is implemented at a time-domain front end of a receiver.

In example 7, the method as recited in any of examples 1 to 4, wherein a decimation filtering of the received RF signal includes low-pass filtering of the received RF signal to produce a channel selected signal.

In example 8, the method as recited in any of examples 1 to 4, wherein the notch filtering is configured to include an interference center frequency based from a channel frequency of the uplink transmission.

In example 9, the method as recited in any of examples 1 to 4, wherein the notch filter is a frequency configurable notch filter.

In example 10, the method as recited in any of examples 1 to 4, wherein the uplink transmission includes one of a 2G. 3G, or an LTE signal.

In example 11, the method as recited in any of examples 1 to 4, wherein the filtering of the uplink transmission is utilized by a Bluetooth receiver to reduce an interference level of frequency hops which are out of cellular interference frequency region.

Example 12 is a device receiver comprising: a component configured to receive a radio frequency (RF) signal during an uplink transmission; a modem configured to produce the uplink transmission; a decimation and notch filter configured to filter the uplink transmission to suppress higher frequency harmonics; a component configured to transform the filtered RF signal from a time-domain to a frequency-domain filtered RF signal; an equalizer and metric extractor configured to determine a residual harmonic frequency confidence level of at least one metric in the frequency-domain filtered RF signal; a tone nulling component configured to discard the at least one metric in response to the determination of the residual harmonic frequency level that is below a threshold; and a forward error correction decoder configured to decode symbols corresponding to one or more metrics that were not discarded due to the tone nulling.

In example 13, the device receiver as recited in example 12, wherein the decimation and the notch filters are positioned at a time-domain front end of the device receiver.

In example 14, the device receiver as recited in example 12, wherein the decimation filter down-samples and low-pass is configured to filter the received RF signal to produce a channel selected signal.

In example 15, the device receiver as recited in example 12, wherein the notch filter is a frequency configurable notch filter.

In example 16, the device receiver as recited in example 12, wherein the equalizer and metric extractor is configured to determine a plurality of equalized received symbols, wherein the determination of the residual harmonic frequency confidence level for each metric is based on the plurality of equalized received symbols.

In example 17, the device receiver as recited in any of examples 12 to 16, wherein the cellular modem is configured to transmit the uplink transmission by a 2G, 3G, or an LTE signal.

In example 18, the device receiver as recited in any of examples 12 to 16 further comprising a complementary code keying (CCK) demodulator/decoding component for the device receiver that is defined by IEEE 802.11b standard.

Example 19 is a method of harmonic spur mitigation in a receiver comprising: receiving of a radio frequency (RF) signal during an uplink transmission or upon receipt of an interfering noise; filtering the uplink transmission at a time-domain front end of the receiver; transforming the received RF signal from a time-domain into a frequency-domain RF signal; determining a residual harmonic frequency confidence level of at least one metric in the frequency-domain RF signal; tone nulling of the at least one metric in response to the determination of the residual harmonic frequency confidence level; and decoding symbols based from one or more metrics that were not discarded due to the tone nulling.

In example 20, the method as recited in example 19, wherein the determining of the residual harmonic frequency confidence level includes comparing of the confidence level to a configured threshold.

What is claimed is:

1. A method of harmonic spur mitigation comprising:
   receiving of a radio frequency (RF) signal during an uplink transmission or upon receipt of an interfering noise from a co-running cellular modem;
   low-pass filtering the received RF signal;
   filtering high frequency harmonic components of the uplink transmission or the interfering noise by a notch filter to prevent the high frequency harmonic components from interfering with the low-pass filtered RF signal; and
   demodulating the low-pass filtered RF signal, where the demodulating further comprises:
      transforming the low-pass filtered RF signal from a time-domain into a frequency-domain low-pass filtered RF signal;
      determining a residual harmonic frequency confidence level of at least one metric in the frequency-domain low-pass filtered RF signal;
      tone nulling of the at least one metric in response to the determination of the residual harmonic frequency confidence level that is below a threshold value; and
      decoding symbols based from a plurality of metrics that remain from the tone nulling.

2. The method as recited in claim 1 further comprising: converting the received RF signal into a digital received RF signal.

3. The method as recited in claim 1, wherein the determining of the residual harmonic frequency confidence level includes comparing of the confidence level to the threshold value.

4. The method as recited in claim 1, wherein the tone nulling discards tone bins that includes the at least one metric with the confidence level that is below the threshold value.

5. The method as recited in claim 1, wherein the demodulating of the low-pass filtered RF signal is implemented in a time-domain.

6. The method as recited in claim 1, wherein the filtering of the uplink transmission is implemented at a time-domain front end of a receiver.

7. The method as recited in claim 1, wherein a decimation filtering of the received RF signal includes the low-pass filtering of the received RF signal to produce a channel selected signal.

8. The method as recited in claim 1, wherein the notch filtering is configured to include an interference center frequency based from a channel frequency of the uplink transmission.

9. The method as recited in claim 1, wherein the notch filter is a frequency configurable notch filter.

10. The method as recited in claim 1, wherein the uplink transmission includes one of a 2G, 3G, or an LTE signal.

11. The method as recited in claim 1, wherein the filtering of the uplink transmission is utilized by a Bluetooth receiver to reduce an interference level of frequency hops which are out of cellular interference frequency region.

12. A device receiver comprising:
   a component configured to receive a radio frequency (RF) signal during an uplink transmission;
   a modem configured to produce the uplink transmission, wherein the modem is co-running with the component;
   a decimation filter configured to low-pass filter the received RF signal and a notch filter configured to filter the uplink transmission to suppress higher frequency harmonics that interfere with the low-pass filtered RF signal;
   a component configured to transform the low-pass filtered RF signal from a time-domain to a frequency-domain low-pass filtered RF signal;
   an equalizer and metric extractor configured to determine a residual harmonic frequency confidence level of at least one metric in the frequency-domain low-pass filtered RF signal;
   a tone nulling component configured to discard the at least one metric in response to the determination of the residual harmonic frequency level that is below a threshold; and
   a forward error correction decoder configured to decode symbols corresponding to one or more metrics that were not discarded due to the tone nulling.

13. The device receiver as recited in claim 12, wherein the decimation and the notch filters are positioned at a time-domain front end of the device receiver.

14. The device receiver as recited in claim 12, wherein the decimation filter is configured to down-sample and low-pass filter the received RF signal to produce a channel selected signal.

15. The device receiver as recited in claim 12, wherein the notch filter is a frequency configurable notch filter.

16. The device receiver as recited in claim 12, wherein the modem is a cellular modem configured to transmit the uplink transmission by a 2G, 3G, or an LTE signal.

17. The device receiver as recited in claim 12, wherein the equalizer and metric extractor is configured to determine a plurality of equalized received symbols, wherein the determination of the residual harmonic frequency confidence level for each metric is based on the plurality of equalized received symbols.

18. The device receiver as recited in claim 12 further comprising a complementary code keying (CCK) demodulator/decoding component for the device receiver that is defined by IEEE 802.11b standard.

19. A method of harmonic spur mitigation in a receiver comprising:
   receiving of a radio frequency (RF) signal during an uplink transmission or upon receipt of an interfering noise from a co-running modem;
   low-pass filtering the received RF signal;
   filtering the uplink transmission at a time-domain front end of the receiver to remove high frequency harmonics that interfere with the low-pass filtered RF signal;
   transforming the low-pass filtered RF signal from a time-domain into a frequency-domain RF signal;

determining a residual harmonic frequency confidence level of at least one metric in the frequency-domain RF signal;

tone nulling of the at least one metric in response to the determination of the residual harmonic frequency confidence level; and decoding symbols based from one or more metrics that were not discarded due to the tone nulling.

20. The method as recited in claim 19, wherein the determining of the residual harmonic frequency confidence level includes comparing of the confidence level to a configured threshold.

* * * * *